United States Patent
Simonsson et al.

(10) Patent No.: US 9,949,279 B2
(45) Date of Patent: Apr. 17, 2018

(54) SELECTION OF TRANSMISSION MODE BASED ON RADIO CONDITIONS

(71) Applicant: Telefonaktiebolaget L M Ericsson (publ), Stockholm (SE)

(72) Inventors: Arne Simonsson, Gammelstad (SE); Björn Halvarsson, Uppsala (SE); Peter Nauclér, Knivsta (SE); Qiang Zhang, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 64 days.

(21) Appl. No.: 14/783,277

(22) PCT Filed: Apr. 9, 2013

(86) PCT No.: PCT/SE2013/050380
§ 371 (c)(1),
(2) Date: Oct. 8, 2015

(87) PCT Pub. No.: WO2014/168527
PCT Pub. Date: Oct. 16, 2014

(65) Prior Publication Data
US 2016/0050680 A1    Feb. 18, 2016

(51) Int. Cl.
*H04W 4/00*    (2009.01)
*H04W 72/08*    (2009.01)
(Continued)

(52) U.S. Cl.
CPC ........ *H04W 72/085* (2013.01); *H04B 7/0689* (2013.01); *H04W 24/10* (2013.01);
(Continued)

(58) Field of Classification Search
CPC . H04W 72/085; H04W 7/0689; H04W 24/10; H04W 72/1273; H04W 76/025; H04L 5/005; H04L 5/0051
See application file for complete search history.

(56) References Cited

U.S. PATENT DOCUMENTS

2010/0173660 A1    7/2010    Liu et al.
2011/0170435 A1*   7/2011    Kim ............... H04L 5/0023
                                                         370/252
(Continued)

OTHER PUBLICATIONS

Bai, D., et al., "LTE—Advanced Modem Design: Challenges and Perspectives", IEEE Communications Magazine, IEEE Service Center, Piscataway, US, vol. 50, No. 2, Feb. 1, 2012, pp. 178-186, XP011417054.

(Continued)

*Primary Examiner* — Abdelnabi O Musa
(74) *Attorney, Agent, or Firm* — Rothwell, Figg, Ernst & Manbeck, P.C.

(57) ABSTRACT

A network node for selecting transmission mode towards a wireless device in a wireless communications network is provided. The wireless communications network comprises a first cell and a second cell. The wireless device is connected to the first cell, which first cell is served by the network node. The network node obtains (301) information about respective downlink signal strength from the first cell to the wireless device, and the second cell to the wireless device. The network node selects (302) transmission mode towards the wireless device based on absolute signal strength and a difference in signal strength between the first cell and the second cell. The difference is calculated based on the obtained information. Publ.

20 Claims, 6 Drawing Sheets

(51) Int. Cl.
*H04B 7/06* (2006.01)
*H04W 24/10* (2009.01)
*H04W 72/12* (2009.01)
*H04W 76/02* (2009.01)
*H04L 5/00* (2006.01)

(52) U.S. Cl.
CPC ..... *H04W 72/1273* (2013.01); *H04W 76/025* (2013.01); *H04L 5/005* (2013.01); *H04L 5/0051* (2013.01)

(56) References Cited

U.S. PATENT DOCUMENTS

| | | | |
|---|---|---|---|
| 2011/0243100 A1 | 10/2011 | Ball et al. | |
| 2012/0213162 A1* | 8/2012 | Koo | H04W 16/14 370/329 |
| 2013/0223258 A1* | 8/2013 | Seo | H04W 24/02 370/252 |
| 2014/0086173 A1* | 3/2014 | Sadeghi | H04L 5/005 370/329 |
| 2014/0148172 A1* | 5/2014 | Brisebois | H04W 36/20 455/438 |
| 2014/0293939 A1* | 10/2014 | Nory | H04W 72/0406 370/329 |
| 2015/0358962 A1* | 12/2015 | Lee | H04W 72/0446 370/336 |
| 2015/0365209 A1* | 12/2015 | Yi | H04L 5/001 370/329 |

OTHER PUBLICATIONS

Supplementary European Search Report, dated Feb. 8, 2016, in corresponding European Application No. 13 88 1555, 5 pages.
Texas Instruments, "Transmit-side Signalling Enhancements Targeting Het-Nets for Rel-11", R1-113244, 3GPP TSG RAN WG1 Meeting #66bis, Zhuhai, China, Oct. 10-14, 2011; Section 2.1. CRS of Dominant Interferer Collides with CRS of Victim Cell, pp. 1-7.
Huawei, Hisilicon, "CoMP transmission mode", R1-123106, 3GPP TSG RAN WG1 Meeting #70, Qingdao, China, Aug. 13-17, 2012, Sections 1 Introduction and 2.2 CoMP PDSCH demodulation over CRS in TM4, 6 pages.

\* cited by examiner

SELECTION OF TRANSMISSION MODE BASED ON RADIO CONDITIONS

CROSS-REFERENCE TO RELATED APPLICATION

This application is a 35 U.S.C. § 371 National Phase Entry Application from PCT/SE2013/050380, filed Apr. 9, 2013, and designating the United States.

TECHNICAL FIELD

Embodiments herein relate to a network node and a method therein. In particular, it relates to selecting transmission format.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Transmission Modes

A user equipment is configured with a transmission mode to help the user equipment to determine how to process data transmissions received on a Physical Downlink Shared Channel (PDSCH). In LTE release 8, a total of seven transmission modes were defined. Transmission modes used in Frequency Division Duplex (FDD) mode of operation have been designed to use Common Reference Symbols (CRS) for data demodulation. CRS may be cell-specific reference signals. The PDSCH demodulation reference signals used in LTE may be CRS, Cell-specific reference signals, and UE-specific reference signals.

Cell-specific reference signals shall be transmitted in all downlink subframes in a cell supporting PDSCH transmission, at least before LTE release 12. Demodulation Reference Signals (DM-RS) are transmitted only on the resource blocks upon which the corresponding PDSCH is scheduled to the user equipment. DM-RS based transmission modes are e.g. Transmission Mode 7 (TM7) defined in LTE release 8, Transmission Mode 8 (TM8) defined in LTE Release 9, Transmission Mode 9 (TM9) defined in LTE Release 10, Transmission Mode 10 (TM10) defined in LTE Release 11, Transmission Mode x (TMx) defined in LTE Release 12. Transmission Modes 1, 2, 3, 4, 5, 6 (TM1, 2, 3, 4, 5, 6) are transmission modes with CRS as the demodulation reference signal.

The DM-RS are transmitted relatively dense in a LTE resource element grid as long as a user equipment is scheduled for DownLink (DL) data. FIG. 1 shows a resource element grid of an LTE subframe where DMRS are embedded. The X axis represents the time domain, number is the OFDM symbol index within one subframe, 1 ms. The Y axis represents the frequency domain, number is the subcarrier index within one Resource Block.

A synchronized network is a network wherein all cells have aligned radio frame and subframe boundary. When a Transmission Mode with DM-RS is deployed in a synchronized network with unshifted CRS configured, DMRS are not interfered by CRS which results in an improved demodulation and receiver performance compared to Transmission Modes which use CRS for demodulation, which CRS are interfered. Transmission Mode with DM-RS therefore can enjoy very good conditions for data demodulation in this scenario.

According to US20120087321, a transmission scheme adds a DM-RS to estimate a channel response for demodulation. When a transmission scheme based on LTE CRS is set in a user equipment, the user equipment cannot receive data in a Multimedia Broadcast Multicast Service Single Frequency Network (MBSFN) sub-frame. To solve this problem a present scheme disclosed in US20120087321 separates and sets a transmission mode for sub-frame and a transmission mode for MBSFN for the user equipment. The user equipment uses different transmission modes in different subframes.

CRS is not transmitted in data region of an MBSFM subframe, the user equipment with CRS based transmission mode cannot receive unicast PDSCH data in MBSFN. This document discloses to use a DM-RS based transmission mode in MBSFN subframe or use the CRS from MBSFN subframe control region to demodulate the unicast PDSCH data.

WO2012129798 discloses a method for applying open-loop pre-coding corresponding to TM3, but over TM9 in because it has not been defined in the LTE standard release. The document discloses how TM9 is adapted more specifically with choice of precoder to Multiple Input Multiple Output (MIMO) rank, velocity of user equipment, antennas etc. The document further discloses how DM-RS is applied depending on rank.

DM-RS will add more overhead leaving less symbols available for data. Extra overhead percentage depends on different control region size, transmission mode, number of antenna ports, etc. The extra overhead percentage may e.g. be ~10%-20%.

To configure a network for a Transmission Mode with DM-RS only, will in most cases result in a not so good capacity because of larger overhead.

To configure for a Transmission Mode with DM-RS transmission per cell is time consuming and costly requiring advanced measurements and network planning.

SUMMARY

It is therefore an object of embodiments herein to provide an improved way of handling different transmission modes for a user equipment to enhance the performance in a wireless communications network.

According to a first aspect of embodiments herein, the object is achieved by a method in a network node for selecting transmission mode towards a wireless device in a wireless communications network. The wireless communications network comprises a first cell and a second cell. The wireless device is connected to the first cell, which first cell is served by the network node.

The network node obtains information about respective downlink signal strength from the first cell to the wireless device, and the second cell to the wireless device.

The network node selects transmission mode towards the wireless device based on absolute signal strength and a difference in signal strength between the first cell and the second cell. The difference is calculated based on the obtained information.

According to a second aspect of embodiments herein, the object is achieved by a network node for selecting transmission mode towards a wireless device in a wireless communications network. The wireless communications network comprises a first cell and a second cell. The wireless device is adapted to be connected to the first cell, which first cell is adapted to be served by the network node. The network node comprises an obtaining circuit configured to obtain information about respective downlink signal strength from the first cell to the wireless device, and the second cell to the wireless device.

The network node further comprises a selecting circuit configured to select transmission mode towards the wireless device based on absolute signal strength and a difference in signal strength between the first cell and the second cell. The difference is calculated based on the obtained information.

By taking relevant information into account, such as information about respective downlink signal strength from the first cell to the wireless device and the second cell to the wireless device, the network node may dynamically select the transmission mode per wireless device based on wireless device's radio conditions. In this way an improved way of handling different transmission modes to enhance the performance in a wireless communications network is provided.

An advantage with embodiments herein is that the spectrum efficiency is improved, since the transmission mode with low interference on demodulation reference signal is selected, the channel estimation accuracy is improved.

The transmission mode with low overhead cost may be selected when the interference on CRS and DM-RS is similar.

This results in that an efficient transmission mode is selected for each user equipment individually depending on radio condition.

An advantage with embodiments herein is that a more robust transmission mode for each wireless device is provided since when the channel estimation is approved the transmission is more robust.

BRIEF DESCRIPTION OF THE DRAWINGS

Examples of embodiments herein are described in more detail with reference to attached drawings in which.

DETAILED DESCRIPTION

Figure 2:
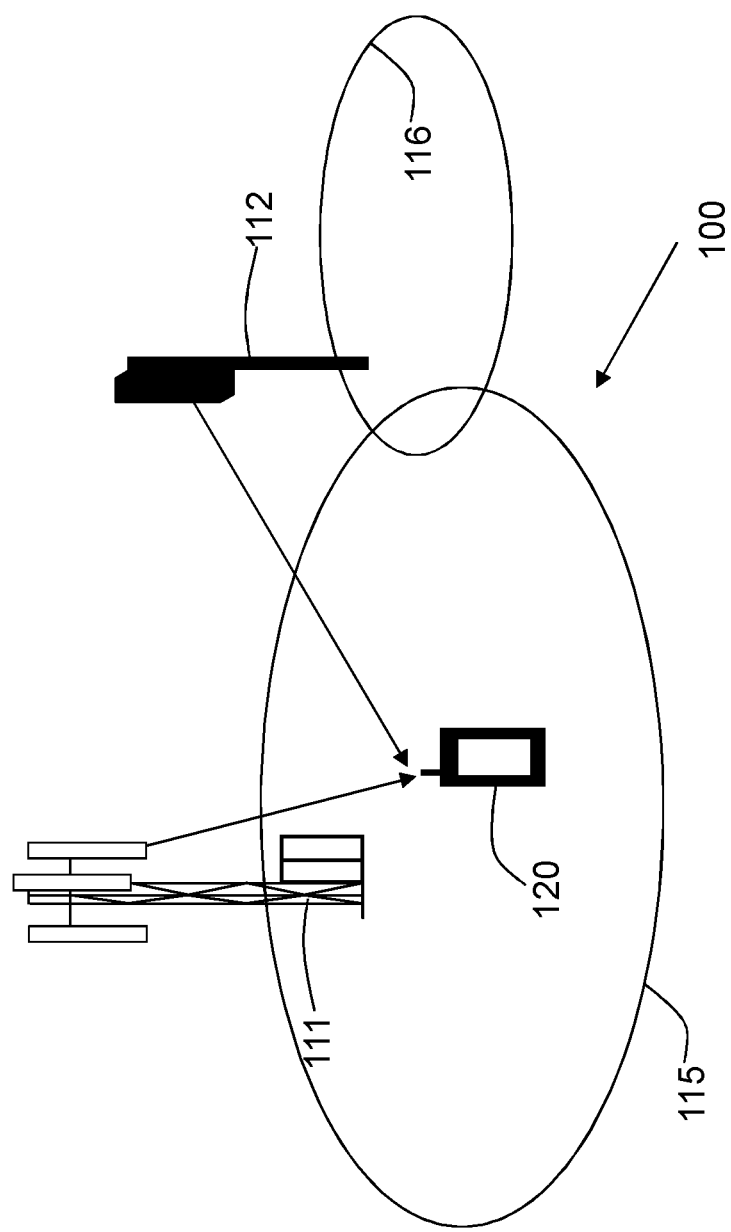
FIG. 2 is a schematic block diagram illustrating embodiments of a wireless communications network.

FIG. 2 depicts an example of a wireless communications network 100 in which embodiments herein may be implemented. The wireless communications network 100 is a wireless communication network such as an LTE, WCDMA, GSM network, any 3GPP cellular network, Wimax, or any cellular network or system. The use case according to embodiments herein is applicable for LTE. However, if another system also uses a cell specific reference signal and user equipment specific reference signal, embodiments herein may be applicable also to other systems.

The wireless communications network 100 comprises a plurality of network nodes whereof two, a network node 111 and a second network node 112 are depicted in FIG. 2. The first network node 111 and the second network node 112 may each be a transmission point such as a radio base station, for example an eNB, an eNodeB, or an Home Node B, an Home eNode B or any other network node capable to serve a user equipment or a machine type communication device in a wireless communications network. The first network node 111 serves a first cell 115 and the second network node 112 serves a second cell 116. However, in some embodiments the network node 111 serves both the first cell 115 and the second cell 116.

A wireless device 120 is located in the first cell 115, served by the first network node 111. The network node 111 and the second network node 112 may each act as a transmission point for the wireless device 120. In this scenario example the wireless device 120 is connected to the first network node 120 but not connected to the second network node 122. The wireless device 120 is within radio range of the second network node 112, this means that it can hear signals from the second network node, even if it is not connected to it.

The first wireless device 120 may e.g. be a user equipment, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any user.

According to embodiments herein, transmission modes such as e.g. TM9 is dynamically configured per wireless device 120 depending on when it is more efficient than an alternative transmission mode such as TM4 or TM3. Transmission modes may be reconfigured per wireless device 120 without service interruption through the Radio Resource Control (RRC) protocol. This results in a dynamic way for the network node 111 to select transmission mode such as between a CRS based transmission mode and DM-RS based transmission mode.

This may e.g. be when: the wireless device is around cell edge; when a geometry factor is below a certain level, and when interference is not limiting; the Reference Signal Received Power (RSRP) is above a certain level, and the interfering cells are in synchronization with unshifted CRS, and the PDSCH interference is low; the load in the neighbor detected cells are below a certain level, or the scheduled PDSCH resources are protected by time/frequency domain Inter-cell Interference Coordination (ICIC).

Figure 3:
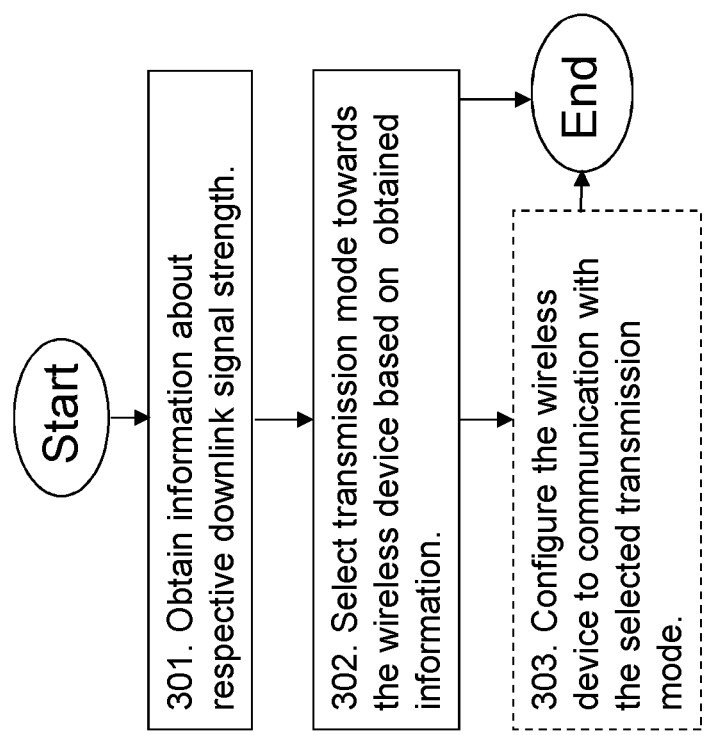
FIG. 3 is a flowchart depicting embodiments of a method in a network node.

Example of embodiments of a method in the network node 111 for selecting transmission mode towards the wireless device 120 in a wireless communications network 100, will now be described with reference to a flowchart depicted in FIG. 3.

The transmission mode is dynamically selected for each wireless device, such as the wireless device 120, individually. The transmission mode may be configured and/or re-configured over the RRC protocol.

As mentioned above, the wireless communications network 100 comprises the first cell 115 and the second cell 116. The wireless device 120 is connected to the first cell 115, which first cell 115 is served by the network node 111. The method comprises the following actions, which actions may be taken in any suitable order. Dashed lines of one box in FIG. 3 indicate that this action is not mandatory.

Action 301

By taking relevant information into account the network node 111 may dynamically select the transmission mode per wireless device based on its radio conditions. Therefore, the network node 111 obtains information about respective downlink signal strength from the first cell 115 to the wireless device 120, and the second cell 116 to the wireless device 120. This information may e.g. be received from the wireless device 120. The signal strength may e.g. be obtained by establishing a path loss to respective connected cell such as the first cell 115 and neighbor cell such as the second cell 116. This may be done by RSRP measured in the wireless device 120 and reported to network node 111. An alternative is for the wireless device 120 to use uplink measurement on Sounding Reference Signals (SRS) in the different network nodes such as the first network node 111 and the second network node 112 which are reported to connected network node such as the first network node 111. Uplink measurements on other transmissions than SRS may also be used, such as ordinary data or control transmissions. When uplink measurements are used the downlink transmit power may preferably be taken into account when estimating the downlink signal strength. Also combinations of RSRP and SRS measurements may be used. When the wireless device 120 reports CSI, the interference part, i.e. the path loss a neighbour cell such as the second cell 116, may be estimated from the interference on CRS. The wireless device 120 reports low CQI when interference on CRS is high. The network node 111 may switch transmission mode based on wireless device 120 reported CQI and the interference level on PDSCH.

By taking further relevant information into account when the network node 111 selects the transmission mode the method may be improved. Any one or more of the information as described below may further be obtained.

In some embodiments, the obtained information further comprises information about the downlink load in the second cell 116. The downlink load information in the second cell 116 may be signalled to the first cell 115 through standard X2 procedure or proprietary interface.

In some embodiments, the obtained information further comprises information about resource scheduling in the respective first cell 115 and second cell 116. The resource scheduling information in the second cell 116 may be signalled to first cell 115 through standard X2 procedure or proprietary interface.

The resources may relate to time and/or frequency resources. The first cell 115 and second cell 116 may schedule same or different subframes, one subframe in LTE is one ms. Or the first cell 115 and second cell 116 may schedule same or different resource blocks, each resource block comprises of 12 subcarriers. The interference on PDSCH in first cell 115 is low at the cell edge if the subframe or resource block is not scheduled in cell 116.

In some embodiments, the obtained information further comprises information about synchronization status between the first cell 115 and the second cell 116. The synchronization status in the second cell 116 may be signalled to first cell 115 through standard X2 procedure or proprietary interface. The synchronization status may also be obtained from a synchronization unit, such as a GPS-clock or similar. The synchronization status may further be obtained from the configuration of the network node 111, configured to be synchronized or not with the second network node 112 handling the neighbour cell such as the second cell 116.

Please note that the any one or more of the different kind of information may be obtained.

Action 302

The network node 111 then selects transmission mode towards the wireless device 120 based on absolute signal strength and a difference in signal strength between the first cell 115 and the second cell 116. The difference is calculated based on the obtained information. The absolute signal strength is the measured RSRP of the cell.

As mentioned above, by taking further relevant information into account when the network node 111 selects the transmission mode the method may be improved. Any one or more of the information as described below may further be a basis for selecting transmission mode.

In the embodiments wherein the obtained information further comprises information about the downlink load in the second cell 116, the selecting of the transmission mode towards the wireless device 120 is further based on the obtained information about the downlink load. This may be obtained within the same network node such as the first network node 111 in case of adjacent sector. This is the case when the second cell 116 is served by the same network node, i.e. the network node 111, as first cell 115. This may further be obtained by via Remote Radio Unit (RRU) or over the X2 interface in case of other network node such as the second network node 112. If the second network node 112 is the RRU, a baseband Hardware (HW) is located at the same place as the first network node 111. The downlink load information may then be obtained within the same network node such as the first network node 111. If the other network node is another eNB, the load information may be signaled through the 3GPP standard inter eNB interface X2.

In the embodiments wherein the obtained information further comprises information about resource scheduling in the respective first cell 115 and second cell 116, the selecting of the transmission mode towards the wireless device 120 is further based on the amount of co-scheduled resources towards the wireless device 120 and scheduled resources in the second cell 116 derived from the obtained information.

In the embodiments wherein the obtained information further comprises information about synchronization status between the first cell 115 and the second cell 116, the selecting of the transmission mode towards the wireless device 120 is further based on the obtained information about the synchronization status.

In some embodiments, the transmission mode is selected out of any one of: a CRS based transmission mode such as TM1-6 and a DM-RS based transmission mode such as TM7-12 and TM above 12. This action and how the transmission modes are selected will be described in detail below.

The spectrum efficiency is improved, since the transmission mode with low interference on demodulation reference signal is selected. The channel estimation accuracy is also improved.

The transmission mode with low overhead cost is selected when the interference on CRS and DM-RS is similar.

This results in that an efficient transmission mode is selected for each user equipment individually depending on radio conditions.

Action 303

The network node 111 then configures the wireless device 120 to communication with the selected transmission mode.

Figure 4:
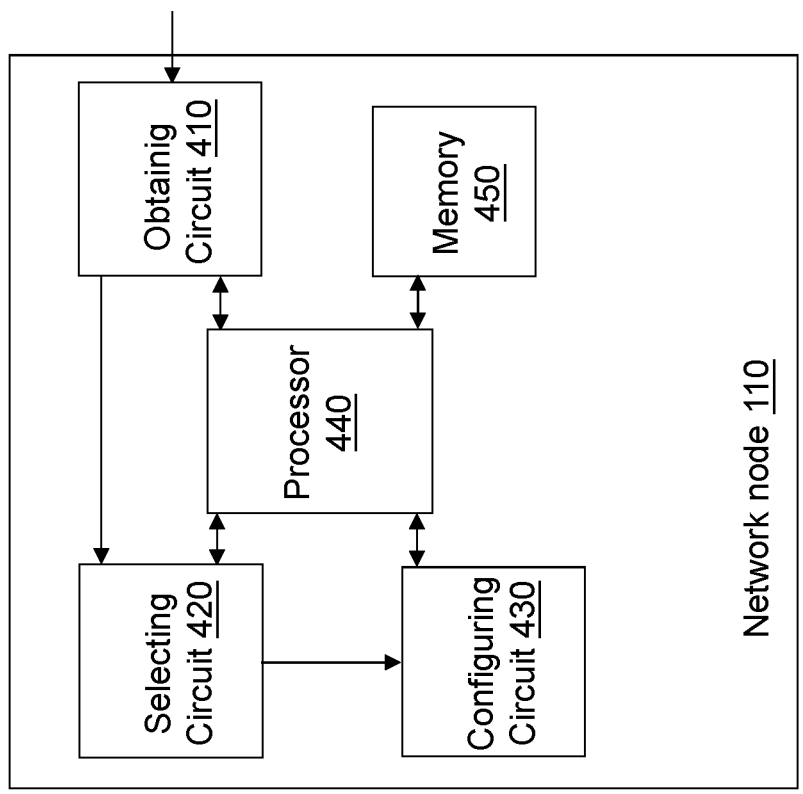
FIG. 4 is a schematic block diagram illustrating embodiments of a network node.

To perform the method actions for selecting transmission mode towards the wireless device 120 in the wireless communications network 100, described above in relation to FIG. 3, the network node 111 comprises the following arrangement depicted in FIG. 4. As mentioned above the wireless communications network 100 comprises a first cell 115 and a second cell 116. The wireless device 120 is adapted to be connected to the first cell 115, which first cell 115 is adapted to be served by the network node 111.

The network node 111 comprises an obtaining circuit 410 configured to obtain information about respective downlink signal strength from the first cell 115 to the wireless device 120, and the second cell 116 to the wireless device 120.

The network node 111 further comprises a selecting circuit 420 configured to select transmission mode towards the wireless device 120 based on absolute signal strength and a difference in signal strength between the first cell 115 and the second cell 116, which difference is calculated based on the obtained information.

In some embodiments, the obtained information further comprises information about the downlink load in the second cell 116. In these embodiments the selecting circuit 420 is further configured to select transmission mode towards the wireless device 120 further based on the obtained information about the downlink load.

In some embodiments, the obtained information further comprises information about resource scheduling in the respective first cell 115 and second cell 116. In these embodiments the selecting circuit 420 is further configured to select transmission mode towards the wireless device 120 further based on the amount of co-scheduled resources towards the wireless device 120 and scheduled resources in the second cell 116 derived from the obtained information.

In some embodiments, the obtained information further comprises information about synchronization status between the first cell 115 and the second cell 116. In these embodiments the selecting circuit 420 is further configured to select transmission mode towards the wireless device 120 further based on the obtained information about the synchronization status.

In some embodiments, the transmission mode is selected out of any one of: a CRS based transmission mode such as TM1-6 and a DM-RS based transmission mode such as TM7-12 and TM above 12.

The network node 111 may further comprise a configuring circuit 430 adapted to configure the wireless device 120 to communication with the selected transmission mode.

The embodiments herein for selecting transmission mode towards the wireless device 120 in the wireless communications network 100 may be implemented through one or more processors, such as a processor 440 in the network node 111 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the in the network node 111. One such carrier may be in the form of a CD ROM disc. It is however feasible with other data carriers such as a memory stick. The computer program code may furthermore be provided as pure program code on a server and downloaded to the network node 111.

The network node 111 may further comprise a memory 450 comprising one or more memory units. The memory 450 is arranged to be used to store obtained information, store data, configurations, schedulings, and applications to perform the methods herein when being executed in the network node 111.

Those skilled in the art will also appreciate that the obtaining circuit 410, selecting circuit 420 and configuring circuit 430 described above may refer to a combination of analog and digital circuits, and/or one or more processors configured with software and/or firmware, e.g. stored in the memory 450, that when executed by the one or more processors such as the processor 440 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

The following description may be applicable to any suitable embodiments herein.

The radio situations where DM-RS based transmission mode is superior to CRS based transmission mode may be identified from radio conditions and network synchronization and/or configuration. By taking relevant information into account the transmission mode can dynamically be selected per wireless device based on its radio conditions.

Figure 1:
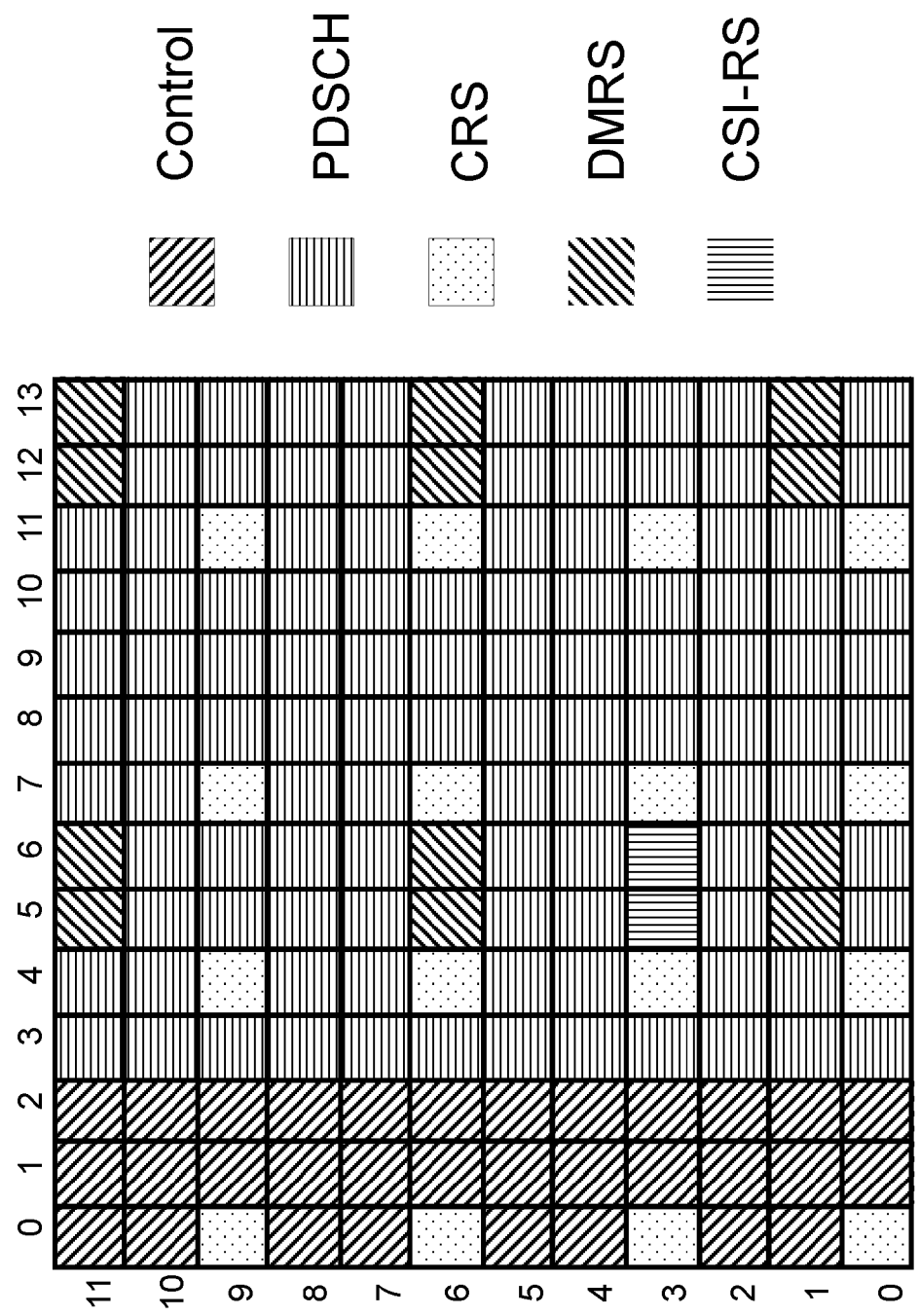
FIG. 1 is a schematic diagram illustrating a resource element grid of an LTE subframe.

The advantage for TM9 compared to TM3/TM4 is a trade-off between demodulation improvement and overhead cost. The demodulation performance depends on the radio quality such as e.g. Signal to Interference-plus-Noise Ratio (SINR) of the used reference symbols sent from the network node 111 to be heard by the wireless device 120. For TM7-10 DM-RS are used and for TM1-6 CRS are used. DM-RS and CRS are located differently in the time-frequency symbol grid, as can be seen from FIG. 1. If CRS symbols are expected to be interfered while DM-RS are not expected to be interfered the demodulation with TM9 is expected to be superior.

The co-channel interference comes from neighbor cells such as the second cell 116, and a good indicator of expected SINR is the geometry factor of the wireless device 120 based on RSRP measurements or of the wireless device 120 reported CQI. Geometry factor, i.e. Geometry=$RSRP_{connected}$–$RSRP_{neighbor}$. At a low geometry factor a low SINR is expected. At higher geometry factor there is not expected any large difference between CRS and DM-RS SINR. Then there is a loss using DM-RS based because its larger overhead, and CRS based transmission mode should be used for the wireless device 120 when having a high geometry factor.

At lower RSRP the noise factor becomes more dominating than interference for SINR. Any interference difference between CRS and DM-RS symbols then has small or no impact. Again the overhead of the DM-RS based transmission mode then result in a loss, and CRS based transmission mode should be used for the wireless device 120 when having a low RSRP.

Figure 5:
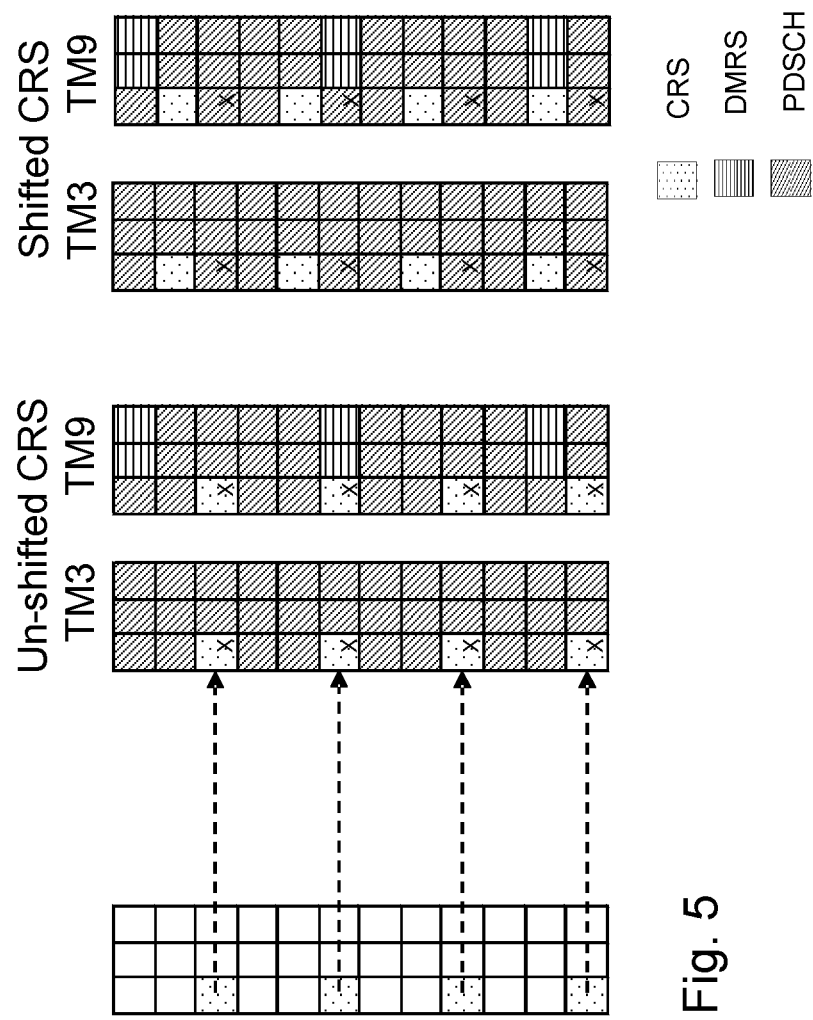
FIG. 5 is a schematic diagram illustrating embodiments herein.

The interference situation for CRS vs. DM-RS depends on network synchronization and configuration as illustrated in FIG. 5. CRS is a cell specific reference signal, it may be used as a demodulation reference signal for PDSCH. Unshifted CRS means that the CRS of both cells, such as the first cell 115 and the second cell 116, are overlapping and the same subcarriers in frequency domain are used for CRS.

In FIG. 5, the column on the left is the CRS mapping of the second cell 116, the four columns to the right are the possible CRS configurations in the first cell 115 and possible transmission modes to be used by the wireless device 120. When the first cell 115 is configured to use unshifted CRS, the CRS from cell 116 will interfere the CRS in first cell 115, CRS based transmission modes are affected, but the DM-RS based transmission modes are not affected. In such a wireless communications network 100, the wireless device 120 when having a low geometry factor and sufficiently high RSRP should use DM-RS based transmission mode.

The CRS symbols used for demodulation will not either be interfered if the first cell 115 is configured to use the shifted CRS, which means that the advantage of DM-RS based transmission mode is lost. The wireless device 120 when having low geometry factor caused by a neighbor cell such as the second cell 116 with shifted CRS shall use CRS based transmission mode. The same applies if the neighbor cell is not synchronized with the cell where the wireless device 120 is connected to, i.e. the first cell 115. The CRS symbols from the neighbor cell, i.e. the second cell 116, will then not interfere on CRS symbols in connected cell and CRS based transmission mode should be used.

In the case there is data load in the neighbor cell, such as the second cell 116, causing low geometry factor for the wireless device 120, the DM-RS will be interfered by PDSCH symbols also from a synchronized neighbor cell. Again, the DM-RS transmission mode advantage over CRS based transmission mode is lost. CRS based transmission mode shall be used for the wireless device 120 when being close to a loaded neighbor cell such as the second cell 116 when being loaded.

An example of the embodiments of the method according to Action 302 above will now be described with reference to FIG. 6.

As mentioned above in Action 301, the network node 111 obtains information about respective downlink signal strength from the first cell 115 to the wireless device 120, and the second cell 116 to the wireless device 120. In this example, this is performed by the network node 111 obtaining a path loss to connected cell such as the first cell, and to neighbor cell such as the second cell 116 is obtained. This may be done by RSRP measured in the wireless device 120 and reported to network node 111. An alternative is for the wireless device 120 to use uplink measurement on Sounding Reference Signals (SRS) in the different network nodes such as the first network node 111 and the second network node 112 which are reported to connected network node such as the first network node 111. Another alternative is to use the wireless device 120 reported CQI. Also combinations of RSRP and SRS measurements may be used.

Figure 6:
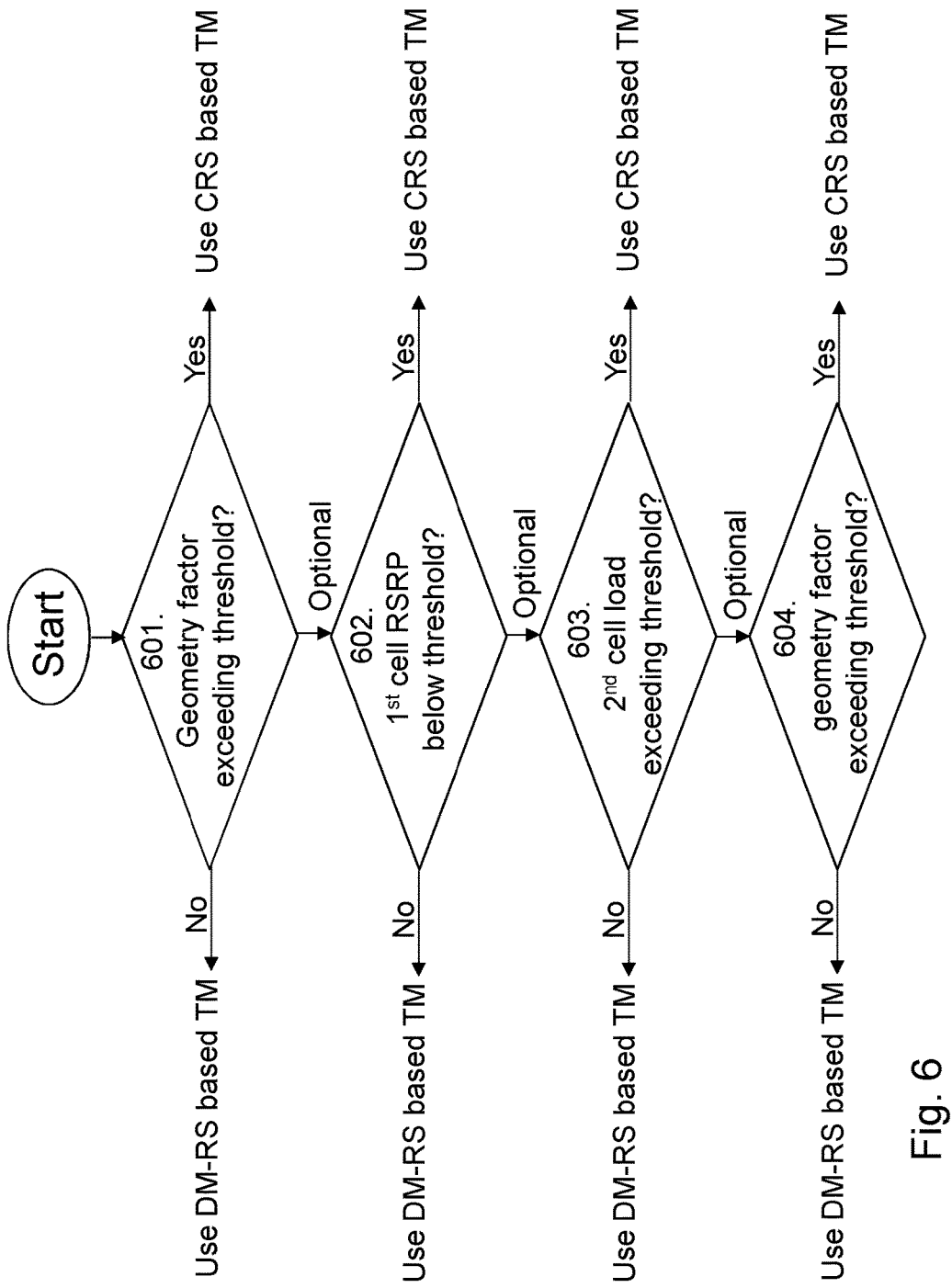
FIG. 6 is a flowchart depicting embodiments of a method in a network node.

Transmission mode is referred to as TM in FIG. 6.

Action 601

In this action a geometry factor of the wireless device 120 is compared to a threshold. As indicated in Action 302 the network node 111 selects transmission mode towards the wireless device 120 based on absolute signal strength and a difference in signal strength between the first cell 115 and the second cell 116. The difference is calculated based on the obtained information. In this example, this is performed by the network node 111 by assessing a geometry factor of the wireless device 120 as the difference between connected cell such as the first cell 115 RSRP and strongest neighbor cell such as the second cell 116 RSRP is calculated.

$$Geometry=RSRP_{connected}-RSRP_{neighbor}$$

An alternative is to calculate a geometry factor based on all measured neighbor cells by the wireless device 120 as the linear sum of RSRP.

The geometry factor is compared to a threshold, for example 9 dB, and if the geometry factor exceeds the threshold, CRS based transmission mode is selected. Otherwise DM-RS based transmission mode is selected.

The geometry factor may also be assessed in other ways from other measures. It may be based on uplink received signal strength in the network node 111 and second network node 112. This may be from Sounding Reference Signal (SRS) transmission, data transmission or any other uplink transmission. In the case of uplink received transmission is used, the downlink transmission may preferably be taken into account to assess the received RSRP in downlink. There may be a heterogeneous network with different power capability in different network nodes, such as the first network node 111 being a macro node with 20 W power transceiver and the second network node 112 being a micro node with 5 W power transceiver. The 6 dB downlink power difference may then preferably be included in the geometry assessment when based on uplink received power. To obtain the pathloss with the uplink measurement on SRS sent from the wireless device 120, together with downlink transmitted power from each cell such as the first cell 115 and the second cell 116, the wireless device 120 received RSRP of the first cell 115 and second cell 116 may be estimated at the network node 111.

Estimated RSRP=CRS Transmitted Power per sub carrier−Pathloss.

The downlink transmission may also be power controlled, not using full power capability of node 111, and the used power may then preferably be taken into account similarly. The estimation is then not "geometry factor" as traditionally used but rather an estimation of wideband SINR before antenna combining of intended downlink transmission. However, the method to decide the use of CRS or DM-RS based transmission mode is the same.

One power control method is the RPS ICIC scheme with power difference on different fixed resource block regions. The power used for the regions where the wireless device 120 is scheduled may then be used in the geometry/SINR assessment.

Yet another method to estimate the geometry factor is to use the reported CQI. In case of non-shifted CRS with DM-RS based transmission mode, the CQI is rather good estimation of geometry since the wireless device 120 estimates the interference on the colliding CRS. Also in other cases the CQI may be used as an assessment of geometry.

Action 602

If CRS based transmission mode is not selected, the first cell 115 RSRP may be compared to a threshold, for example −105 dBm, and if it is below the threshold, CRS based transmission mode is selected.

In case of path loss estimated on uplink transmission or downlink power control the same downlink power compensation as described in action 601 may preferably be done.

Otherwise DM-RS based transmission mode is selected or as an alternative proceed to any of the actions below.

Action 603

If CRS based transmission mode is not selected, the network node 111 may obtain the strongest neighbor cell load such as the second cell load. As mentioned above in Action 301 the obtained information may further comprise information about the down link load in the second cell 116.

The neighbor downlink cell load, e.g. the second cell 116 load is then compared to a threshold and if exceeded CRS based transmission mode is selected. This relates to Action 302.

In this Action, inter-cell interference coordination in time or frequency may be taken into account. This relates to Action 301, wherein the obtained information further may comprise information about resource scheduling in the respective first cell 115 and second cell 116. It further relates to Action 302 wherein the selecting of the transmission mode towards the wireless device 120 is further based on the amount of co-scheduled resources towards the wireless device 120 and scheduled resources in the second cell 116 derived from the obtained information. In this example, only the actual interference on a resource block where the wireless device 120 will be scheduled is considered. That is only the resource blocks which are scheduled to the wireless device 120 in cell 115 and at the same time that are scheduled to any device in cell 116. This will capture whether any ICIC algorithm is applied to protect the wireless device 120 from strong interference. There will then not be any co-scheduled resource blocks, or a limited amount of co-scheduled resource blocks, or not any co-scheduled resource blocks with the neighboring cell such as the second cell 116. In case of an ICIC algorithm is applied, the obtaining of scheduling information may be inherited, such as High Interference Indication (HII) and Overload Indication (OI) over X2, for this purpose, and may also be done less frequently depending on what type of ICIC algorithm. There are also more fixed ICIC schemes that may be configured such as Almost Blank Subframes (ABS) and Reduced Power Subframes (RPS). The load information is then obtained only for the fixed fraction of resources where the wireless terminal 120 is scheduled.

Also the optional Action 603 may take several neighbor cells load into account by obtaining all detected cells load and assess the data interference, for example as the linear sum of RSRP multiplied by PDSCH channel utilization. Also in case of scheduling information and ICIC schemes scheduling, information from several cells may be obtained. There may be no colliding resources with the neighbor cell with strongest RSRP, possibly because of an ICIC scheme. Then the scheduling information from the second strongest (or more) neighbor cell may be obtained. The geometry factor is then estimated for that neighbor cell in action 601. The inter-cell interference coordination is then compared to a threshold and if exceeded, CRS based transmission mode is selected. Example of threshold values are: 50% channel utilization for an overall load measure, 20% colliding resources for scheduling information and ICIC.

Otherwise DM-RS based transmission mode is selected or as an alternative proceed to next action below.

Action 604

If CRS based transmission mode is not selected, the network node 111, the wireless communications network 100 synchronization status is obtained for the strongest neighbor cell. This refers to Action 301 above wherein the obtained information further may comprise information about synchronization status between the first cell 115 and the second cell 116. As mentioned in Action 302, the selecting of the transmission mode towards the wireless device 120 is further based on the obtained information about the synchronization status. This means in this example that if the strongest network cell is out of sync with the connected cell, such as the first cell 115, or the CRS are shifted compared to the connected cell, CRS based transmission mode is selected. Otherwise DM-RS based transmission mode is selected. If load information is obtained for several neighbor cells in action 603, then also the synchronization for these cells are obtained.

Note that Actions 601-604 may be taken in any suitable order. After selecting the transmission mode, the wireless device 120 is configured with the selected transmission mode with RRC, as referred to in Action 303.

Extension to Alternative Antenna Configurations

The above description is suitable for 2 cross polarized transmit (TX) antennas of a MIMO antenna system or other multiple antenna system in the wireless device and in the network node 111. The embodiments herein are also applicable for other antenna configurations if different threshold settings are used.

For example, with 4 and 8 TX antennas and 2 TX-ports of a MIMO antenna system in the wireless device and in the network node 111 the DM-RS-based transmission mode enables 4-8 layer transmission compared to only 4 with CRS based transmission mode. This MIMO antenna system advantage for DM-RS-based transmission mode will result in threshold adjustments biased to select TM9 more. With 4 TX ports of a MIMO antenna system in the wireless device and in the network node 111 there is no such difference between DM-RS-based transmission mode and CRS based transmission mode.

With closely co-polarized antennas of a MIMO antenna system in the wireless device and in the network node 111 beam-forming may improve coverage by forming narrower antenna beams with higher gain in a certain direction.

DM-RS-based transmission mode that enables non-codebook precoding, non-quantized phase transmissions, will enable better coverage than CRS based transmission mode with code-book based precoding, a limited set of transmission phase combinations, in certain angular directions of the beam.

Also with such a configuration the thresholds may be biased towards more DM-RS-based transmission mode use. The used precoders, if close to one in the code-book or not, also may indicate if a specific wireless device such as the wireless device 120, gets a large advantage using DM-RSbased transmission mode. If the non-code book based precoder chosen for DM-RS-based transmission mode is close to the code-book based precoder chosen for CRS based transmission mode there is no significant advantage to use DM-RS-based transmission mode. If the non-code book based precoder chosen for DM-RS-based transmission mode is close to the code-book based precoder chosen for CRS based transmission mode there is no significant advantage to use DM-RS-based transmission mode.

Extension to Combine with Advanced DM-RS-Based Transmission Mode Features:

TM9 is an enabler for more advanced features, such as non-code-book precoding described above. When some of these features are used, the DM-RS-based transmission mode advantage is such that DM-RS-based transmission mode should always be selected.

For other features the gain may sometimes still not justify using DM-RS-based transmission mode for all wireless devices. Then the embodiments herein may be used with adjusted thresholds biased towards more DM-RS-based transmission mode use taking feature gain into account.

Self-Organizing Network (SON) Extensions

The wireless device 120 receiver implementation and performance has a large impact on how to set the different thresholds. Statistics may be collected per wireless device type comparing CRS based transmission mode and DM-RS-based transmission mode performance in different radio connections. The thresholds may then be set self-organized per wireless device type.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method for selecting a transmission mode for use with a wireless device in a wireless communications network comprising a first cell and a second cell, wherein the wireless device is located within the first cell and is connected to a first transmission point (TP) serving the first cell, the method comprising:
obtaining first information indicating a first downlink signal strength of a first signal transmitted by the first TP;
obtaining second information indicating a second downlink signal strength of a second signal transmitted by a second TP serving the second cell;
determining a difference between the first downlink signal strength and the second downlink signal strength;
determining whether the determined difference in signal strength exceeds a threshold;
selecting, by the first TP, a transmission mode for use with the wireless device based at least in part on whether the determined difference in signal strength exceeds the threshold,
wherein the first TP is configured such that:
as a result of a determination that the determined difference in signal strength exceeds the threshold, a first transmission mode is selected; and
as a result of a determination that the determined difference in signal strength is less than the threshold, a second transmission mode is selected.

2. The method according to claim 1, further comprising the first TP obtaining information indicating a downlink load in the second cell, wherein selecting the transmission mode is further based on the obtained information indicating the downlink load.

3. The method according to claim 1, further comprising the first TP obtaining information indicating a resource scheduling in the respective first cell and second cell, wherein selecting the transmission is further based on the amount of co-scheduled resources towards the wireless device and scheduled resources in the second cell derived from the obtained information.

4. The method according to claim 1, further comprising the first TP obtaining information indicating a synchronization status between the first cell and the second cell, wherein selecting the transmission mode is further based on the obtained information about the synchronization status.

5. The method according to claim 1, further comprising:
the first TP configuring the wireless device to use the selected transmission mode.

6. The method according to claim 1, wherein selecting the transmission mode comprises selecting a transmission mode from a set of transmission modes, wherein the set of transmission modes includes: a Common Reference Symbols, CRS, based transmission mode and a Demodulation Reference Signals, DM-RS, based transmission mode.

7. The method of claim 1, further comprising the first TP determining whether the first downlink signal strength exceeds a threshold, wherein
selecting the transmission mode is further based on whether the first downlink signal strength exceeds the threshold.

8. The method of claim 1, wherein the first transmission mode is a Common Reference Symbols, CRS, base transmission mode, and the second transmission mode is a Demodulation Reference Signals, DM-RS, based transmission mode.

9. The method of claim 1, wherein selecting the transmission mode for use with the wireless device based at least in part on the determined difference in signal strength further comprises determining whether a condition is satisfied, wherein determining whether the condition is satisfied comprises one or more of:
determining whether the first downlink signal strength is below a second threshold;
determining whether a value indicating a cell load at the second TP exceeds a third threshold; and
determining whether a value indicating a synchronization status between the first TP and the second TP is below a fourth threshold.

10. The method of claim 9, wherein selecting a transmission mode for use with the wireless device based at least in part on the determined difference in signal strength further comprises selecting a first transmission mode as a result of a) determining that the condition is satisfied and b) determining that the determined difference exceeds the threshold.

11. A network node for selecting a transmission mode for use with a wireless device in a wireless communications network comprising a first cell served by a first transmission point (TP) and a second cell served by a second TP, wherein the wireless device is located within the first cell, the network node comprising:
a memory; and
one or more processors coupled to the memory for configuring the network node to:
obtain first information indicating a first downlink signal strength of a first signal transmitted by the first TP;

obtain second information indicating a second downlink signal strength of a second signal transmitted by a second TP serving the second cell;

determine a difference between the first downlink signal strength and the second downlink signal strength;

determine whether the determined difference in signal strength exceeds a threshold; and select a transmission mode for use with the wireless device based at least in part on the determined difference in signal strength;

wherein the network node is further configured such that:
as a result of a determination that the determined difference in signal strength exceeds the threshold, a first transmission mode is selected; and
as a result of a determination that the determined difference in signal strength is less than the threshold, a second transmission mode is selected.

12. The network node according to claim 11, wherein the network node is further configured to obtain information indicating a downlink load in the second cell and select the transmission mode based on the obtained information indicating the downlink load.

13. The network node according to claim 11, wherein the network node is further configured to obtain information indicating a resource scheduling in the respective first cell and second cell and select the transmission mode based on the amount of co-scheduled resources towards the wireless device and scheduled resources in the second cell derived from the obtained information.

14. The network node according to claim 11, wherein the network node is further configured to obtain information indicating a synchronization status between the first cell and the second cell and select the transmission mode based on the obtained information about the synchronization status.

15. The network node according to claim 11, wherein the network node is adapted to configure the wireless device to use the selected transmission mode.

16. The network node according to claim 11, wherein the network node is configured to select the transmission mode from a set of transmission modes, wherein the set of transmission modes includes: a Common Reference Symbols, CRS, based transmission mode and a Demodulation Reference Signals, DM-RS, based transmission mode.

17. The network node of claim 11, wherein the network node is further configured to determine whether the first downlink signal strength exceeds a threshold select the transmission mode based on the determined difference in signal strength and whether the first downlink signal strength exceeds the threshold.

18. The network node of claim 11, wherein the first transmission mode is a Common Reference Symbols, CRS, base transmission mode, and the second transmission mode is a Demodulation Reference Signals, DM-RS, based transmission mode.

19. The network node of claim 11, wherein the network node is further configured to determine whether a condition is satisfied by performing a process comprising one or more of: i) determining whether the first downlink signal strength is below a first threshold; ii) determining whether a value indicating a cell load at the second TP exceeds a second threshold; and iii) determining whether a value indicating a synchronization status between the first TP and the second TP is below a third threshold; and the network node is configured to select the transmission mode for use with the wireless device based on the determined difference in signal strength and whether the network node has determined that the condition is satisfied.

20. The network node of claim 19, wherein the network node is configured such that the network node selects a first transmission mode as a result of the network node determining that a) the condition is satisfied and b) the determined difference exceeds the threshold, and the network node is configured such that the network node selects a second transmission mode as a result of the network node determining that either a) the condition is not satisfied or b) the determined difference does not exceed the threshold.

* * * * *